US008996689B2

(12) United States Patent
Muhanna et al.

(10) Patent No.: US 8,996,689 B2
(45) Date of Patent: Mar. 31, 2015

(54) METHODS OF OPERATING NETWORKS, APPLICATION SERVERS, AND WIRELESS DEVICES SUPPORTING MACHINE-TO-MACHINE APPLICATIONS

(75) Inventors: Ahmad Muhanna, Richardson, TX (US); Ke-Chi Jang, Plano, TX (US); Marvin Bienn, Dallas, TX (US); Octavio Jose De Franca Lima, The Colony, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 738 days.

(21) Appl. No.: 13/155,115

(22) Filed: Jun. 7, 2011

(65) Prior Publication Data

US 2012/0124201 A1 May 17, 2012

Related U.S. Application Data

(60) Provisional application No. 61/412,560, filed on Nov. 11, 2010.

(51) Int. Cl.
*G06F 15/173* (2006.01)
*H04L 12/28* (2006.01)
*H04W 4/00* (2009.01)
*H04L 29/06* (2006.01)

(52) U.S. Cl.
CPC ............... *H04W 4/005* (2013.01); *H04L 69/18* (2013.01)
USPC .......................................... 709/224; 370/254

(58) Field of Classification Search
USPC ......................................................... 709/224
See application file for complete search history.

(56) References Cited

U.S. PATENT DOCUMENTS

| 2008/0027947 | A1* | 1/2008 | Pritchett et al. | 707/10 |
|---|---|---|---|---|
| 2008/0153521 | A1* | 6/2008 | Benaouda et al. | 455/466 |
| 2010/0030785 | A1* | 2/2010 | Wilson et al. | 707/10 |
| 2010/0223378 | A1* | 9/2010 | Wei | 709/224 |
| 2010/0304716 | A1* | 12/2010 | Hoeksel et al. | 455/411 |
| 2011/0213871 | A1* | 9/2011 | DiGirolamo et al. | 709/223 |
| 2011/0249636 | A1* | 10/2011 | Cherian et al. | 370/329 |
| 2011/0268047 | A1* | 11/2011 | Nath et al. | 370/329 |
| 2012/0004003 | A1* | 1/2012 | Shaheen et al. | 455/509 |

(Continued)

OTHER PUBLICATIONS

Machine-to-Machine Communications (M2M); Functional Architecture, ETSI Draft; 0002V062; European Telecommunications Standards Institute (ETSI). draft ETSI TS 102 690 v0.6.2, pp. 1-116, Oct. 14, 2010.

*Primary Examiner* — Guang Li

(57) ABSTRACT

A machine-to-machine application server may provide a machine-to-machine application. A machine-to-machine application identification from a machine-to-machine service device may be provided at the machine-to-machine application server. The machine-to-machine application identification may identify a machine-to-machine application provided by the machine-to-machine application server, and the machine-to-machine application identification may identify a communication path between the wireless device and the machine-to-machine application server. Service may be provided according to the machine-to-machine application from the machine-to-machine application server to the machine-to-machine service device using the machine-to-machine application identification to identify the communications path between the machine-to-machine application server and the machine-to-machine service device.

20 Claims, 15 Drawing Sheets

(56) References Cited

U.S. PATENT DOCUMENTS

2012/0072533 A1* 3/2012 O'Neil .......................... 709/217
2012/0106431 A1* 5/2012 Wu et al. ....................... 370/312
2012/0302229 A1* 11/2012 Ronneke ..................... 455/422.1

* cited by examiner

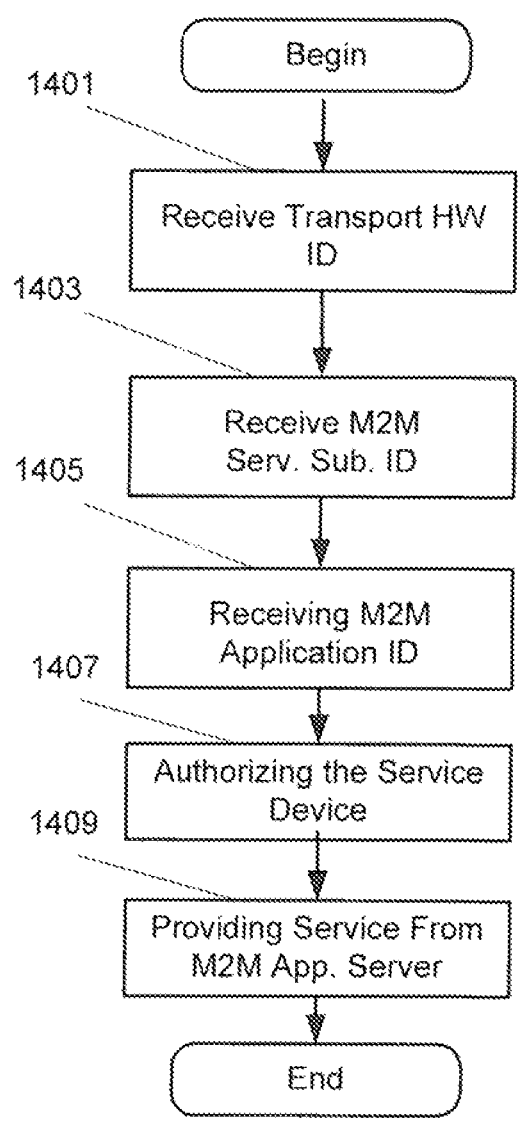

METHODS OF OPERATING NETWORKS, APPLICATION SERVERS, AND WIRELESS DEVICES SUPPORTING MACHINE-TO-MACHINE APPLICATIONS

RELATED APPLICATION

The present application claims the benefit of priority of U.S. Provisional Application No. 61/412,560 entitled "Generic Information Model For M2M" and filed Nov. 11, 2010, the disclosure of which is hereby incorporated herein in its entirety by reference.

TECHNICAL FIELD

The present disclosure is directed to communications and, more particularly, to radio access networks, wireless terminals, and servers, and related methods.

BACKGROUND

In a typical cellular radio system, wireless terminals (also referred to as wireless mobile terminals, user terminals and/or user equipment nodes or UEs, mobile stations, etc.) communicate via a radio access network (RAN) with one or more core networks. The RAN covers a geographical area which is divided into cell areas, with each cell area being served by a RAN node, e.g., a radio base station (BS), which in some networks is also called a "NodeB" or enhanced NodeB "eNodeB." A cell area is a geographical area where radio coverage is provided by the base station equipment at a base station site. The base stations communicate through radio communication channels with UEs within the coverage area of the base stations. The type of radio communication channels utilized between the base station and the UE define the radio access technology (RAT). There are circuit-switched radio access technologies that support circuit-switched operations, for example CDMA (code division multiple access) or GSM (Global System for Mobile Communications), and there are packet-data radio access technologies that support packet-data operations, for example High Rate Packet Data (HRPD), Long Term Evolution (LTE), and/or Third Generation Partnership Project (3GPP/3GPP2).

A Radio Access Network may provide voice and/or data communication for subscriber wireless terminals. A Radio Access Network, for example, may provide couplings between a wireless application service device (also referred to as a service device) or devices and one or more remote application servers. In a direct access network, the network may be overloaded when a number of wireless application service devices connected directly to the Radio Access Network exceeds network capacity. To reduce a number of service devices connecting directly to the Radio Access Network, a nested architecture may be provided whereby a plurality of application service devices are networked through a common wireless terminal (also referred to as a transport device) providing communications with the Radio Access Network.

By way of example, a plurality of wireless service devices may be coupled (via wired and/or wireless link such as Bluetooth, WiFi, etc.) to a common wireless transport device providing a communication link between the plurality of wireless service devices through the Radio Access Network to an application server(s). The wireless transport device may thus serve as a concentrator that provides transport of service information between an application service device(s) and an application server(s) through the Radio Access Network.

Even in light of communications discussed above, there continues to exist demand for improved methods/devices supporting access through Radio Access Networks between application service devices and application servers. For example, existing methods may not be adequate for mobile M2M applications.

SUMMARY

According to some embodiments, a machine-to-machine application server may provide a machine-to-machine application. A machine-to-machine application identification may be provided from a machine-to-machine service device at the machine-to-machine application server. The machine-to-machine application identification may identify a machine-to-machine application provided by the machine-to-machine application server, and the machine-to-machine application identification may identify a communication path between the wireless device and the machine-to-machine application server. Service may be provided according to the machine-to-machine application from the machine-to-machine application server to the machine-to-machine service device using the machine-to-machine application identification to identify the communications path between the machine-to-machine application server and the machine-to-machine service device.

By providing the machine-to-machine application identification that identifies the communications path between the machine-to-machine device and the machine-to-machine application server, a mobility of the machine-to-machine service device may be enhanced. Such a machine-to-machine application identification may provide a structure of device/service/application identifications that allows a same service device to communicate with the application server through a Radio Access Network using a direct coupling with the Radio Access Network and/or using an indirect coupling through a Radio Access Network through one or more intermediate transport devices. Moreover, the same service device may couple through different transport devices at different times.

According to some other embodiments, a method of operating a wireless device may include transmitting a transport hardware identification from the wireless device to a wireless access network to initiate a wireless communications link wherein the transport hardware identification uniquely identifies the wireless device. Responsive to the wireless access network providing a wireless communications link, a transport subscription identification may be transmitted from the wireless device to the wireless access network. A transport address may be received from the wireless access network wherein the transport address defines a network address for the wireless device. A machine-to-machine application identification may be transmitted to the wireless access network wherein the machine-to-machine application identification identifies a machine-to-machine application provided by a machine-to-machine application server and wherein the machine-to-machine application identification identifies a communication path between the wireless device and the machine-to-machine application server. In addition, communication may be provided with the machine-to-machine application server over a machine-to-machine data transport layer through the wireless access network using the transport address as the network address for the wireless device.

According to still other embodiments, a wireless device may include a transceiver configured to provide a wireless communications link with a wireless access network, memory, and a processor. The memory may be configured to store a transport hardware identification that uniquely identifies the wireless device, a transport subscription identification for the wireless device, and a machine-to-machine application identification that identifies a machine-to-machine application provided by a machine-to-machine application server. In addition, the machine-to-machine application identification may identify a communication path between the wireless device and the machine-to-machine application server. The processor may be coupled to the transceiver and the memory, and the processor may be configured to: transmit the transport hardware identification through the transceiver to the wireless access network to initiate a wireless communications link; transmit the transport subscription identification through the transceiver to the wireless access network responsive to the wireless access network providing a wireless communications link; receive a transport address from the wireless access network through the transceiver wherein the transport address defines a network address for the wireless device; transmit the machine-to-machine application identification through the transceiver to the wireless access network; and provide communication with the machine-to-machine application server over a machine-to-machine data transport layer through the transceiver and the wireless access network using the transport address as the network address for the wireless device.

According to yet other embodiments, a machine-to-machine application server may include memory and a processor coupled to the memory. The memory may be configured to provide a machine-to-machine application identification from a machine-to-machine service device. Moreover, the machine-to-machine application identification may identify a machine-to-machine application provided by the machine-to-machine application server, and the machine-to-machine application identification may identify a communication path between the wireless device and the machine-to-machine application server. The processor may be configured to provide service according to the machine-to-machine application from the machine-to-machine application server to the machine-to-machine service device using the machine-to-machine application identification to identify the communications path between the machine-to-machine application server and the machine-to-machine service device.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIGS. 15 to 17 are flow charts illustrating operations of machine-to-machine application servers of FIGS. 1, 4, 7, 10, and 13 according to some embodiments.

DETAILED DESCRIPTION

Figure 1:
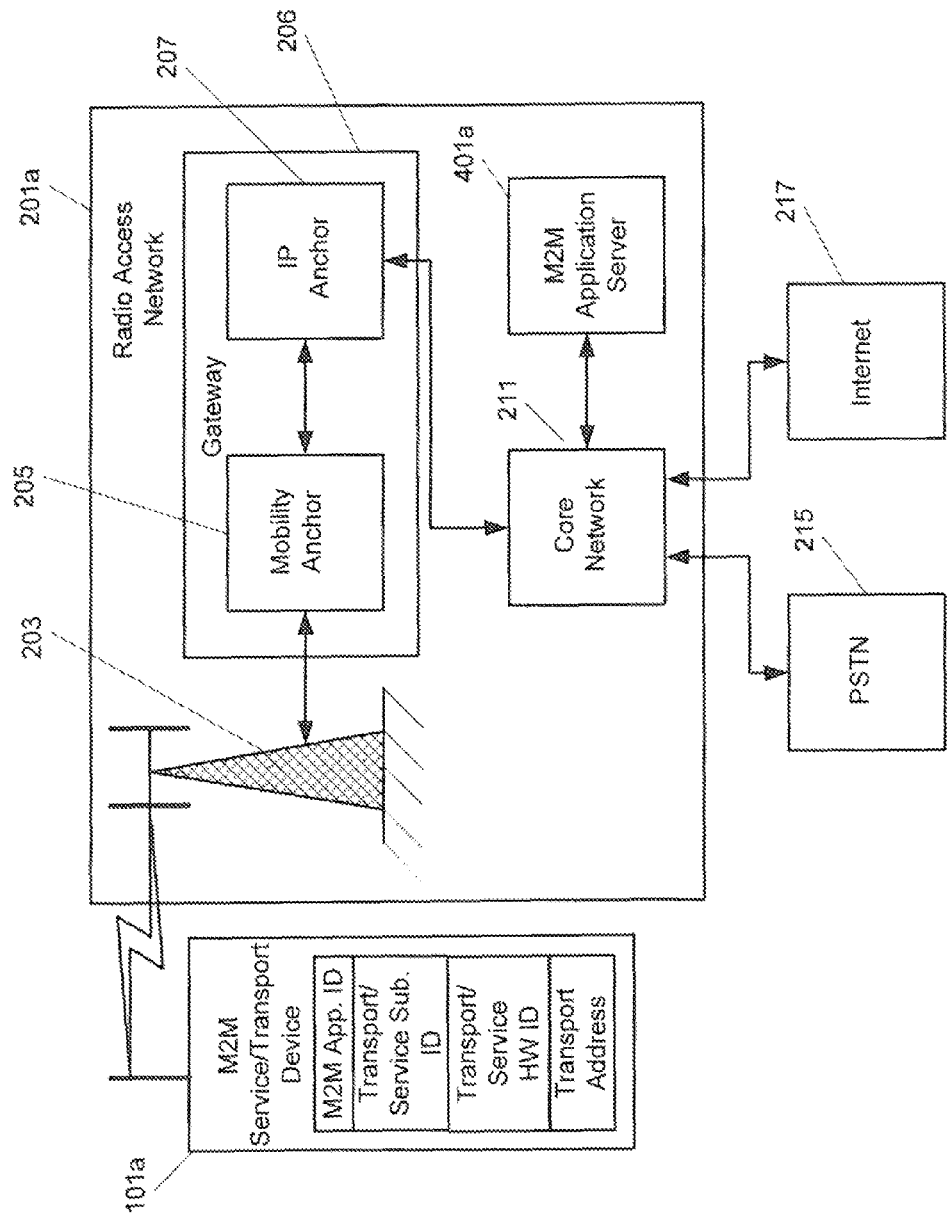
FIG. 1 is a block diagram of a communication system that is configured to support machine-to-machine applications according to some embodiments.

Embodiments of the present invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in one or more other embodiments.

For purposes of illustration and explanation only, these and other embodiments of the present invention are described herein in the context of operating in a RAN that communicates over radio communication channels with wireless terminals (also referred to as wireless mobile terminals, user terminals, user equipment nodes or UEs, mobile stations, etc.). It will be understood, however, that the present invention is not limited to such embodiments and may be embodied generally in any type of communication network. As used herein, a wireless terminal can include any device that receives data from and/or transmits data to a communication network, and may include, but is not limited to, a mobile radiotelephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. A radio network controller may be connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for wireless terminals.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other Radio Access Network systems, including WCDMA (Wideband Code Division Multiple Access), WiMax (Worldwide Interoperability for Microwave Access), UMB (Ultra Mobile Broadband) and GSM (Global System for Mobile Communications), may also benefit from exploiting embodiments of the present invention disclosed herein.

Also note that terminology such as eNodeB (Evolved Node B) and UE (User Equipment) should be considering non-limiting and does not imply a certain hierarchical relation between the two. In general an "eNodeB" and a "UE" may be considered as examples of respective different communications devices that communicate with each other over radio communication channels. While embodiments discussed herein may focus on an service device initiating communications with an application server, embodiments may be applied, for example, where the application server initiates the communication with the service device.

According to some embodiments, a machine-to-machine (M2M) service device may be configured to communicate with an M2M application server directly through a Radio Access Network, and/or the M2M service device may be configured to communicate with the M2M application server through a transport device and the Radio Access Network (e.g., indirectly through the Radio Access Network). Moreover, the same M2M service device may be configured to communicate at different times directly and indirectly through the Radio Access Network. Accordingly, the M2M service device may be provided with an M2M service hardware identification (ID) and an M2M service subscription identification (ID), used to access the application server, that are distinct from a transport hardware identification (ID) and a transport subscription identification (ID), used to access the Radio Access network. An M2M service device may thus be configured to communicate with the M2M application server using an M2M service hardware ID, an M2M service subscription ID, a transport hardware ID, and a transport subscription ID all assigned to the M2M service device. In addition or in an alternative, the M2M service device may be configured to communicate with the M2M application server using M2M service hardware and subscription IDs assigned to the M2M service device, with communications provided through a transport device and the Radio Access Network between the M2M service device and the M2M application server using transport hardware and transport subscription IDs of the transport device. Accordingly, the M2M service hardware and M2M service subscription IDs used to obtain access to the M2M application server may be separate from transport hardware and transport subscription IDs used to obtain access to the Radio Access Network.

Figure 14:
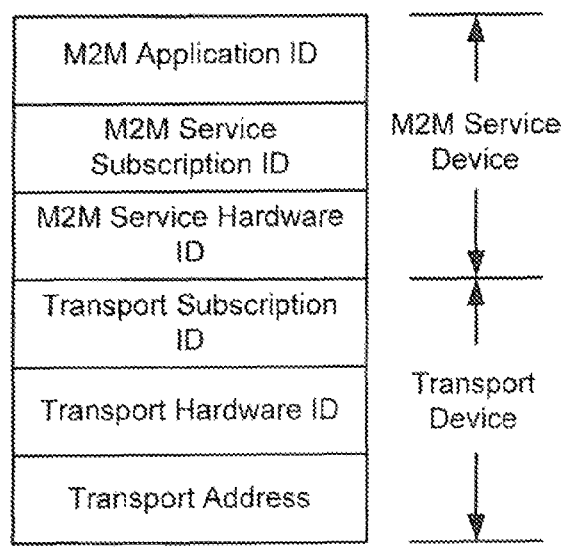
FIG. 14 is a diagram illustrating a machine-to-machine information model of identifications according to some embodiments.

According to some embodiments, an M2M information model may be provided according the structure of FIG. 14. More particularly, the M2M information model may include an M2M application ID, an M2M service subscription ID, and an M2M service hardware ID associated with the M2M service device, and a transport subscription ID, a transport hardware ID, and a transport address associated with the transport address. Where the M2M service device communicates indirectly with the Radio Access Network through a separate transport device, the M2M application ID, the M2M service subscription ID, and the M2M service hardware ID are assigned to the M2M service device, and the transport subscription ID, the transport hardware ID, and the transport address are assigned to the transport device. Accordingly, each device may have three layers of identifiers.

In embodiments discussed herein, the M2M service device is responsible for service level interactions between the M2M application at the M2M service device and the M2M application server, and three possible layers of identifiers are associated with the M2M service device: the M2M application ID, the M3M service subscription ID, and the M2M service hardware ID. The transport device is responsible for transport level interactions to transport information between the M2M service device and the M2M application server through the Radio Access Network, and three possible layers of identifiers are associated with the transport device: transport subscription ID, the transport hardware ID, and the transport address. Depending on the deployment scenario, an M2M service device/application may use all or a subset of the identifications/addresses of FIG. 14.

The transport hardware ID of FIG. 14 may uniquely identify the transport hardware device that is used to access the Radio Access Network. The transport hardware ID, for example, may include a serial number, Medium Access Control (MAC) address, an International Mobile Equipment Identification (IMEI), and/or a Mobile Equipment Identification (MEID). More particularly, the transport hardware ID may include a manufacturer ID and a number that is unique within the manufacturer domain or the manufacturer device type. Where separate transport and M2M service devices are used (to provide indirect communication between the M2M service device and the M2M application server), the transport hardware ID and the M2M service hardware ID may be different. Where the M2M service device communicates directly with the Radio Access Network, the transport hardware ID and the M2M service hardware ID may be the same and/or one of the transport hardware ID or the M2M service hardware ID may be omitted.

The M2M service hardware ID of FIG. 14 may uniquely identify the service device that hosts the M2M application used to connect to the M2M application server. The M2M service hardware ID, for example, may include a serial number, Medium Access Control (MAC) address, an International Mobile Equipment Identification (IMEI), and/or a Mobile Equipment Identification (MEID). More particularly, the M2M service hardware ID may include a manufacturer ID, an M2M device class (if needed), and/or a number that is unique within the manufacturer domain or the manufacturer device type. As noted above, the transport hardware ID and the M2M service hardware ID may be different where separate transport and M2M service devices are used (to provide indirect communication between the M2M service device and the M2M application server). Where the M2M service device communicates directly with the Radio Access Network, the transport hardware ID and the M2M service hardware ID may be the same and/or on the transport hardware ID or the M2M service hardware ID may be omitted.

The transport subscription ID of FIG. 14 may be used to identify a type of subscription governing communications/interactions between/with the transport hardware device and the Radio Access Network (RAN). The transport subscription ID may be assigned to the transport hardware device by the RAN and/or an operator thereof. Moreover, the transport subscription ID may be used to identify the operator/provider of the transport hardware device, and it may be used to identify routing of requests to the transport hardware device. The transport subscription ID, for example, may include Network Access Identifier (NAI), an International Mobile Subscriber Identity (IMSI), a Mobile Identification (MIN), a Mobile Subscriber Integrated Services Digital Network Number, and/or a Mobile Directory Number. The transport subscription ID and the M2M service subscription ID may be different. Moreover, the transport subscription ID used for communication between an M2M service device and an M2M application server may change if a different transport devices and/or Radio Access Networks are used to provide the link therebetween.

The M2M service subscription ID of FIG. 14 may be used to identify a type of subscription governing interactions/communications between an M2M service device and an M2M application service provider (operating one or more M2M application servers that host the application service). The M2M service subscription ID may be assigned to the M2M service device by the M2M application server and/or an operator thereof. Moreover, the M2M service subscription ID may be used to identify the M2M service provider operating the M2M server(s) hosting the M2M application, and the M2M service subscription ID may be used to identify routing of requests to the M2M service provider. The M2M service subscription ID, for example, may include Network Access Identifier (NAI), an International Mobile Subscriber Identity (IMSI), a Mobile Identification (MIN), a Mobile Subscriber Integrated Services Digital Network Number, and/or a Mobile Directory Number. As noted above, the transport subscription ID and the M2M service subscription ID may be different. Moreover, the M2M service subscription ID used for communication between an M2M service device and an M2M application server may change if the M2M service provider changes.

The M2M application ID of FIG. 14 may be used to uniquely identify the M2M application residing on the M2M service device. More particularly, the M2M application ID may be globally unique. The M2M application ID may be transparent to the transport service operator (e.g., to the RAN operator), and the M2M application ID may be owned/assigned by the M2M application service provider. Accordingly, the M2M application ID for the application residing on the M2M service device may change if the M2M service provider changes. More particularly, the M2M application ID may be provided according to a format of a Uniform Resource Identifier (URI), and the M2M application ID may identify a communication path between the M2M service device and an M2M application server.

The transport address of FIG. 14 may be assigned to the transport device by the RAN as a network address for the transport device. More particularly, the RAN may assign the transport address to the transport device responsive to receipt of the transport hardware and subscription IDs, and responsive to authenticating the transport device using the hardware and subscription IDs. The transport address, for example, may be an Internet Protocol (IP) address (e.g., an IPv4 or IPv6 address) providing a logical address for the transport device on the Radio Access Network.

Depending on a particular different deployment scenario that is employed, an M2M service device/application and/or transport device may use all or a subset of the identifiers of FIG. 14 as discussed in greater detail below.

According to some embodiments illustrated in FIGS. 1-3 and 15-16, an M2M service device 101a may communicate directly with RAN 201a, and the same provider may provide both transport and application services. Stated in other words, wireless device 101a may provide functionality of both transport and service devices, and the same provider may operate both RAN 201a and M2M application server 401a (which may be considered an element of RAN 201a). Because service and transport functions are integrated in one device and because a same provider operates both RAN 201a and M2M application server 401a, transport and service hardware IDs may be mapped to a single hardware ID (shown as transport/service hardware ID), and transport and service subscription IDs may be mapped to a single subscription ID (shown as transport/service subscription ID).

More particularly, Radio Access Network (RAN) 201a may include base station 203 (such as an eNodeB), gateway 206, and core network 211 providing voice and/or data communications between wireless device 101a and public switched telephone network 215 and/or the Internet 217 as shown in FIG. 1. In addition, base station 203, gateway 206, and core network 211 may provide transport level communications between an M2M application residing on wireless device 101a (also referred to as an M2M service device) and M2M application server 401a. In addition, M2M application server 401a may be included as an element of RAN 201a, with RAN 201a and M2M application server 401a being operated by a same service provider. More particularly, gateway 206 may include mobility anchor 205 (such as a base station controller) and Internet Protocol (IP) anchor 207 (such as a Packet Data Network gateway or PDN gateway).

Figure 12:
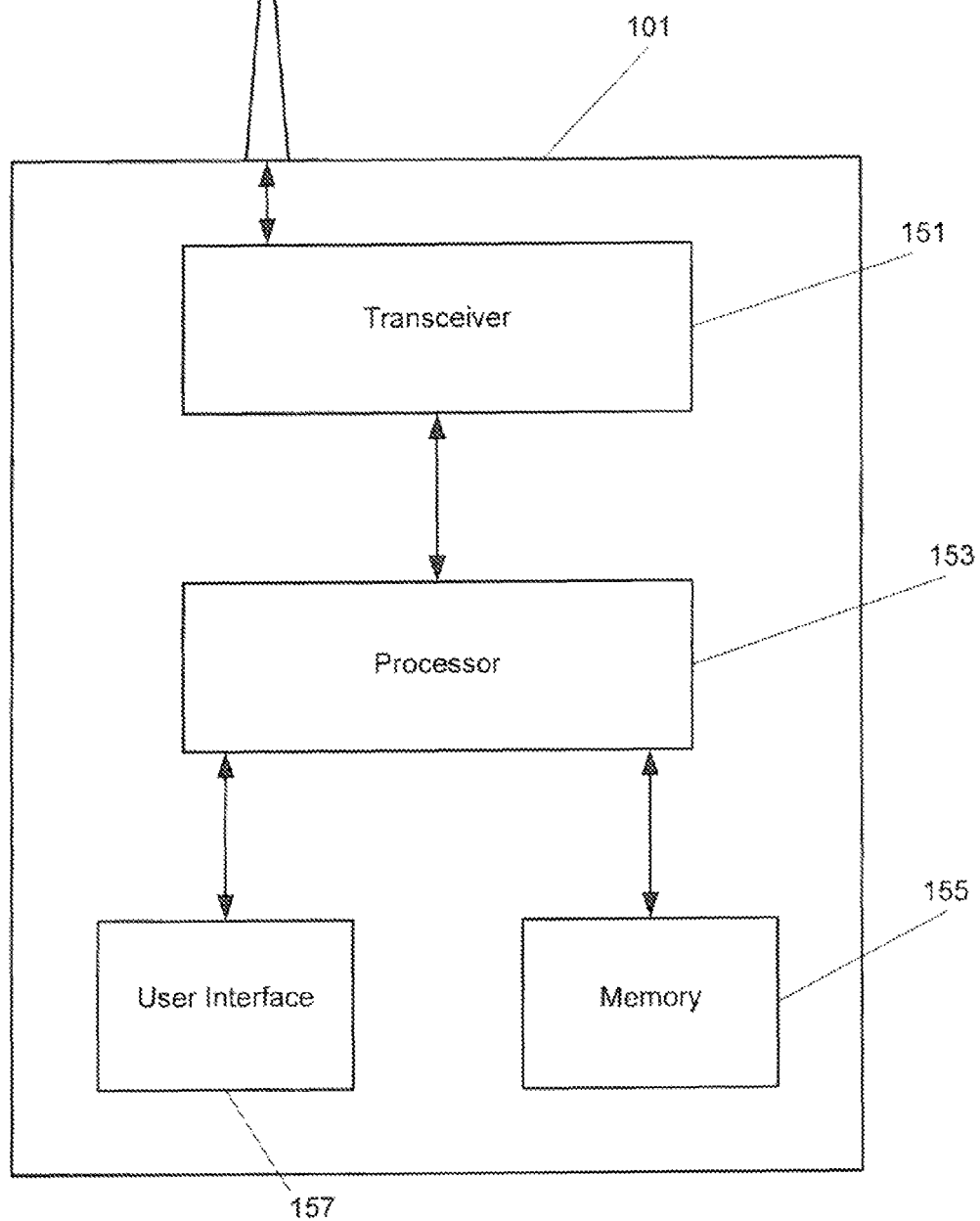
FIGS. 12 and 13 are respective block diagrams of wireless devices and machine-to-machine application servers of FIGS. 1, 4, 7, and 10 according to some embodiments.
Figure 13:
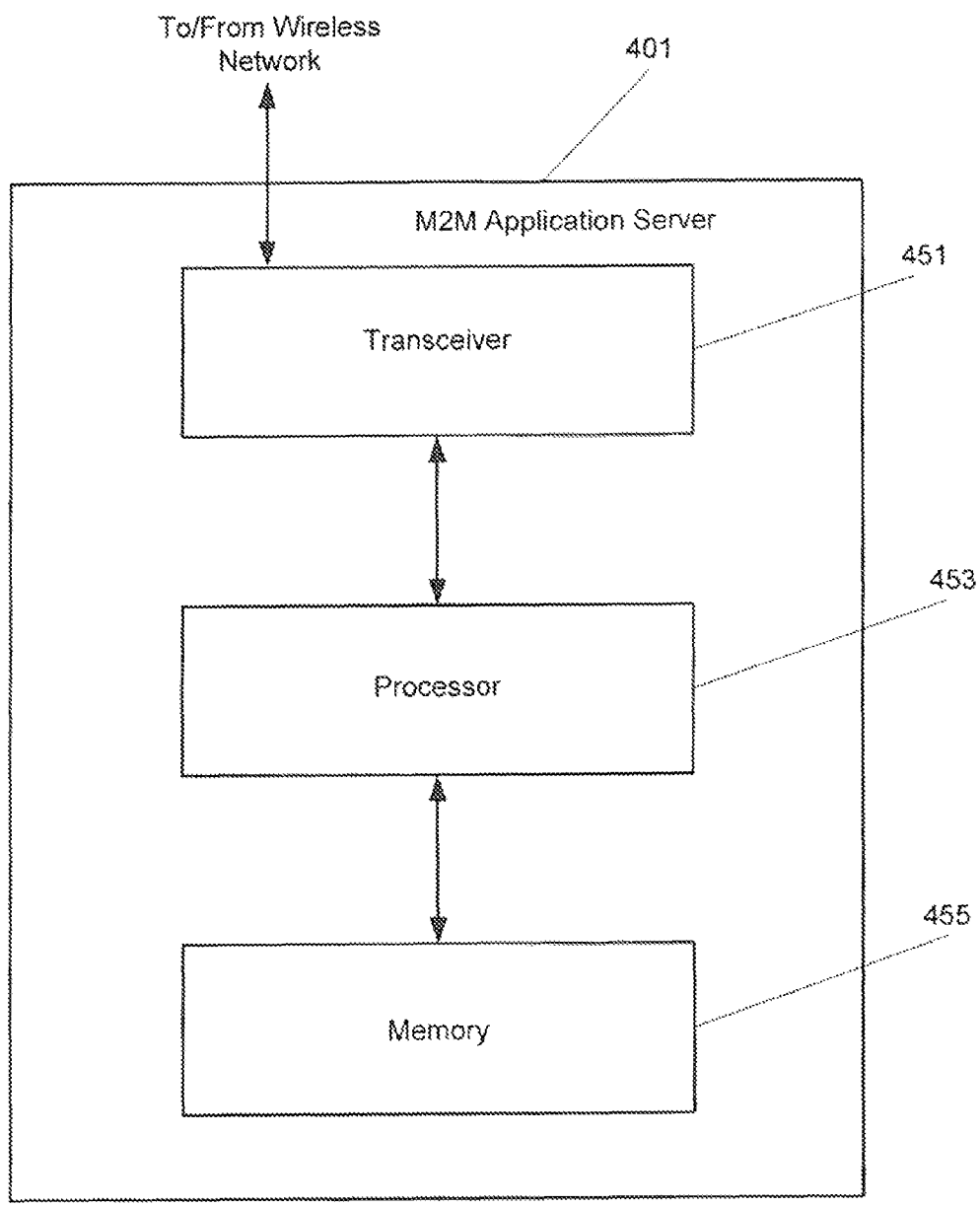

Moreover, wireless device 101a may be provided according to the structure of FIG. 12 including transceiver 151, processor 153, memory 155, and user interface 157. Transceiver 151 and base station 203 may thus be configured to provide a wireless communications link between processor 153 and gateway 206. Memory 155 may be configured to store identification elements shown in FIG. 1 (including transport address, transport/service hardware ID, transport/service subscription ID, and M2M application ID) and to store code for the service application residing at wireless device 101a. In addition, M2M application server 401a may be provided according to the structure of FIG. 13 including transceiver 451, processor 453, and memory 455, with memory 455 storing code for the application service residing at M2M application server 401a. Accordingly, processors 153 and 453 may provide the application service for wireless device 101a.

Figure 3:
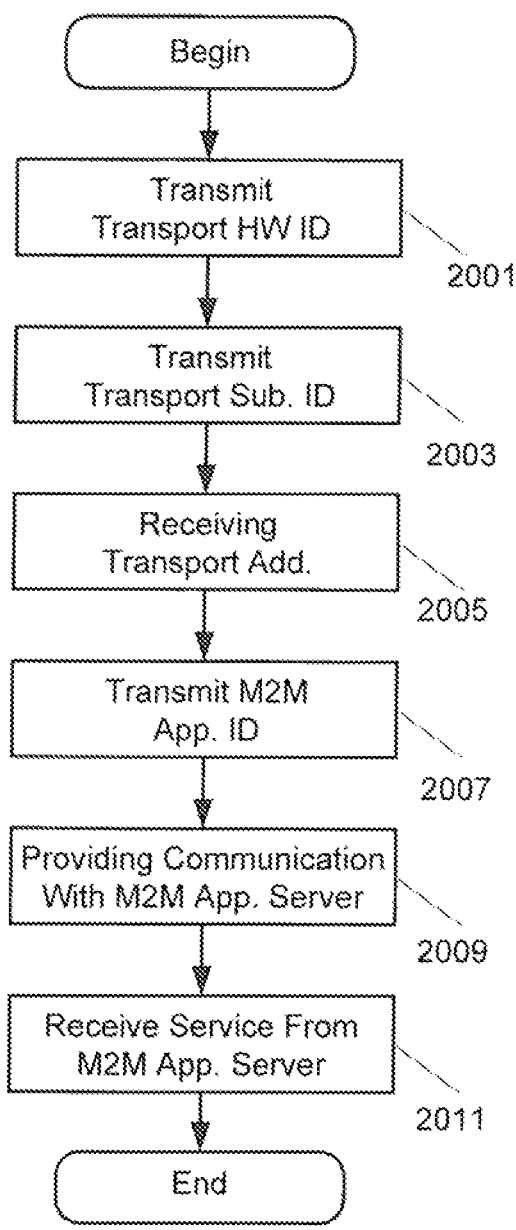
Figure 4:
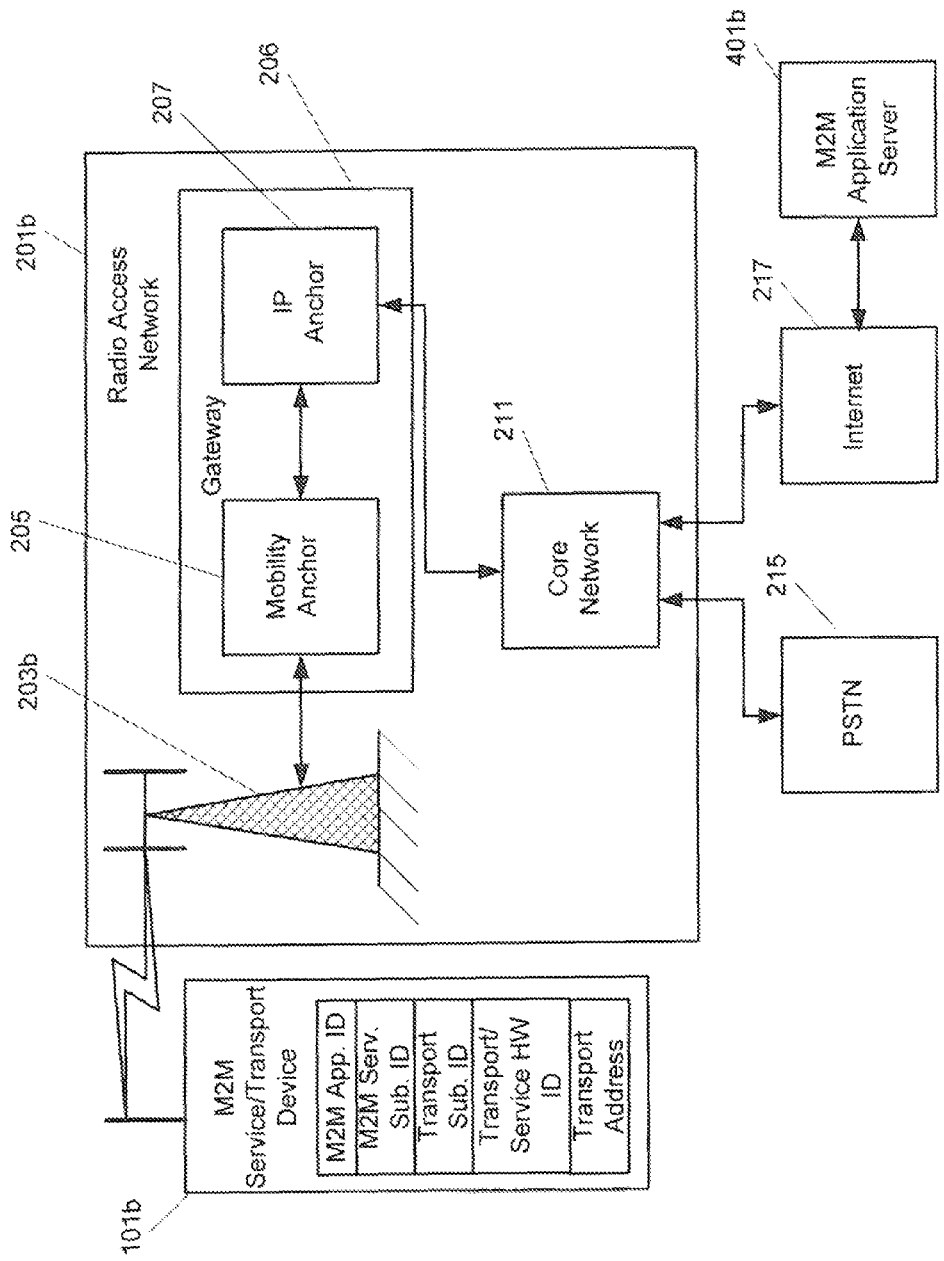
FIG. 4 is a block diagram of a communication system that is configured to support machine-to-machine applications according to some embodiments.

Operations of wireless device 101a are shown in FIG. 3. As shown in FIG. 3, processor 153 may be configured to transmit the transport hardware ID (from memory 155) through transceiver 151 and base station 203 to gateway 206 at block 2001, and gateway 206 may be configured to authorize or block communications from wireless device 101a based on the transport hardware ID. As noted above, transport hardware ID may uniquely identify wireless device 101a. If wireless device 101a is authorized to proceed responsive to the transport hardware ID, processor 153 may be configured to transmit the transport subscription ID (from memory 155) through transceiver 151 and base station 203 to gateway 206 at block 2003, and gateway 206 may be configured to verify or block communications from wireless device 101a based on the transport subscription ID. If wireless device 101a is verified responsive to the transport subscription ID, gateway 206 may transmit a transport address (e.g., an IP address) through base station 203, and the transport address may be received (through transceiver 151) at processor 153 at block 2005 and saved in memory 155. Once the transport address is received at wireless device 101a, a transport layer may be available between wireless device 101a and M2M application server 401a through base station 203, gateway 206, and core network 211, and the transport address may define a network address for wireless device 101a.

Once the transport layer is available, service layer communications may be transmitted over the transport layer between wireless device 101a and M2M application server 401a, and service layer communications provided over the transport layer may be transparent with respect to base station 203, gateway 206, and core network 211. At block 2007, processor 153 may transmit M2M application ID over the transport layer to establish communications with M2M application server 401a. The M2M application ID identifies the M2M application provided by M2M application server 401a, and M2M application ID also identifies a communication path between wireless device 101a and M2M application server 401a. In addition to the identification of the M2M application, M2M application ID may also include elements identifying wireless device 101a, such as elements of some or all of service hardware ID and/or service subscription ID.

Because service and transport device functionalities are integrated in wireless device 101a and because the same service provider operates both RAN 201a and M2M application server 401a, separate authorization/verification operations may not be required for wireless device 101a at M2M application server 401a. Stated in other words, the initial authorization/verification based on the transport hardware and/or transport subscription IDs may be sufficient for access to/through both RAN 201a and M2M application server 401a. Accordingly, processor 153 may provide communication with M2M application server 401a over an M2M data transport layer through RAN 401a at block 2009 using the transport address as the network address for wireless device 101a. At block 2011, processor 153 may receive service from M2M application server 401a over the M2M data transport layer, with M2M application server authorization based on the transport hardware ID and/or the transport subscription ID.

Figure 2:
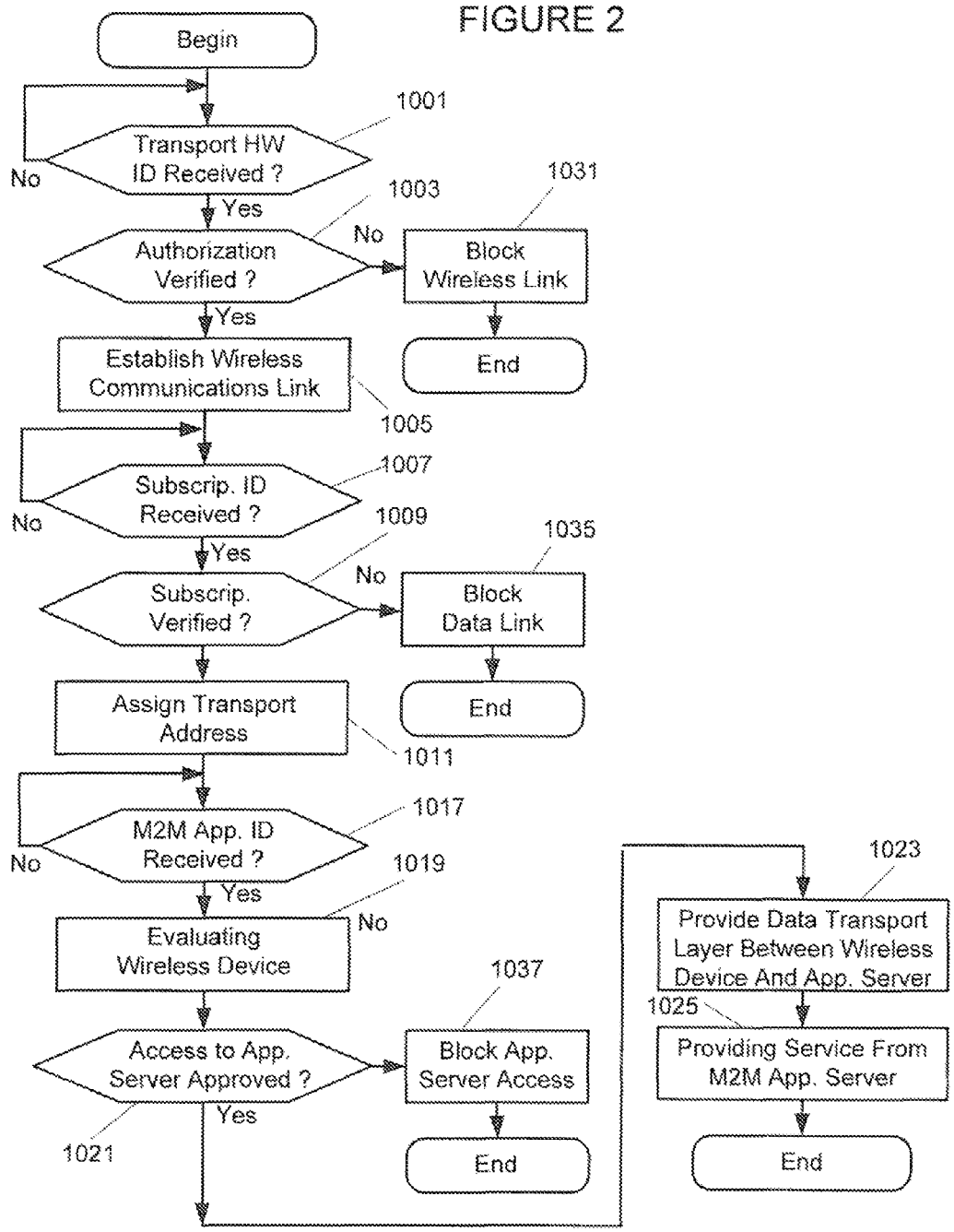
FIGS. 2 and 3 are flow charts illustrating operations of network and wireless terminal elements of FIG. 1 according to some embodiments.

Operations of RAN 201a are shown in FIG. 2. As shown in FIG. 2, responsive to receiving the transport hardware identification from wireless device 101a through base station 203 at gateway 206 at block 1001, mobility anchor 205 may be configured to verify whether the transport hardware ID of wireless device 101a is authorized. Responsive to determining that the transport hardware ID is not authorized, mobility anchor 205 may be configured to block communication between wireless device 101a and RAN 201a. Responsive to determining that the transport hardware ID is authorized, mobility anchor 205 may be configured to establish a wireless communications link between wireless device 101a and RAN 201a at block 1005.

Responsive to receiving the transport subscription ID from wireless device 101a at gateway 206 at block 1007, IP anchor 207 may be configured to verify whether the transport subscription ID of wireless device 101a is authorized. Responsive to determining that the transport subscription ID is not authorized, IP anchor 207 may be configured to block a data link at block 1035. Responsive to determining that the transport subscription ID is authorized, IP anchor 207 is configured to assign a transport address as a network address for wireless device 101a at block 1011, and to transmit the transport address to wireless device 101a. Responsive to receiving the M2M application ID from wireless device 101a at block 1017, IP anchor 207 may evaluate wireless terminal 101a based on its transport subscription ID at block 1019. Responsive to determining that wireless device 101a is not authorized to communicate with M2M application server 401a at block 1021 (based on evaluation of its subscription ID), IP anchor 207 may be configured to block access to M2M application server 401a at block 1037. Responsive to determining that wireless device 101a is authorized to communicate with M2M application server 401a at block 1021, IP anchor 207 (and more generally gateway 206) may be configured to provide an M2M data transport layer at block 1023 between wireless device 101a and M2M application server 401a using the transport address as a network address for wireless device 101a. At block 1025, M2M application server 401a may be configured to provide service for wireless device 101a.

Figure 15:
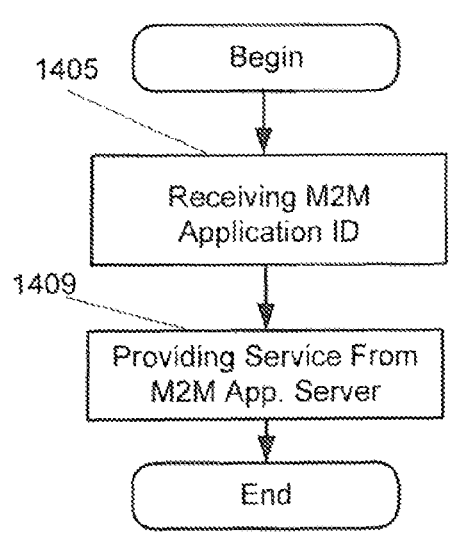

FIG. 15 is a flow chart showing operations of M2M application server 401a. Because M2M application server 401a is provided as an element of RAN 201a and/or because a same service provider operates both M2M application server 401a and RAN 201a, separate authorization at M2M application server 401a may not be required. In other words, authorization at gateway 206 based on transport hardware and transport subscription IDs may be sufficient for access to RAN 201a and M2M application server 401a. Accordingly, responsive to receiving the M2M application ID from wireless device 101a through transceiver 451 at processor 453 at block 1405, processor 453 of M2M application server 401a may provide service for wireless device 101a through transceiver 451. As noted above, the M2M application ID may identify an M2M application provided by M2M application server 401a as well as a communications path between wireless device 101a and M2M server 401a. Accordingly, M2M server 401a may be configured to use the M2M application identification to identify the communications path between M2M application server and wireless device 101a. While not shown as a separate step, processor 453 may also save the M2M application ID in memory 455.

Figure 16:
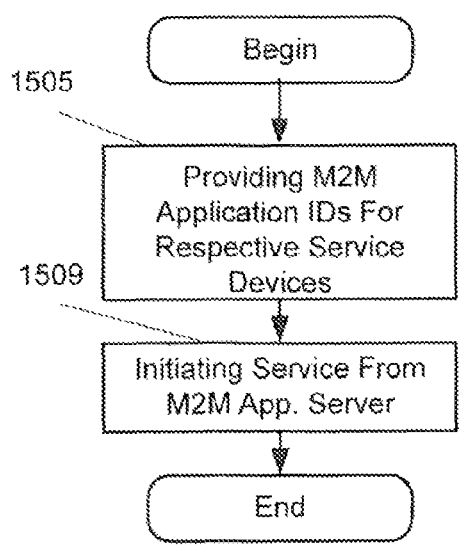

In addition or in an alternative, M2M application server 401a may be configured to initiate service with wireless device 101a using the M2M application ID for wireless device 101a, which may have been previously stored in memory 455 as discussed below with respect FIG. 16. In particular, processor 453 may provide at block 1505 a plurality of different M2M application IDs associated with a respective plurality of difference wireless devices. Accordingly, processor 453 may select the M2M application ID for wireless device 101a to initiate service for wireless device 101a at block 1509. A first service for wireless device 101a, such as a registration service, may be used to transmit the M2M application ID for wireless device 101a from wireless device 101a to M2M application server 401a, for example, as discussed above with respect to FIGS. 2 and 3. M2M server 401a, for example, may periodically (e.g., at timed intervals) initiate service to automatically retrieve information from wireless device 101a, and/or M2M server 401a may initiate service to download updates to wireless device as needed when updates are available.

According to some embodiments illustrated in FIGS. 4-6 and 16-17, wireless device 101b (providing both transport and M2M service device functionality) may communicate directly with RAN 201b, but different providers may operate RAN 201b and M2M application server 401b. Because service and transport functions are integrated in one device, transport and service hardware IDs may be mapped to a single hardware ID (shown as transport/service hardware ID). Because M2M application server 401b operates outside of RAN 201b, however, different service and transport subscription IDs may be required at M2M service device 101b so that M2M service device 101b can be separately authenticated by RAN 201b and M2M application server 401a.

More particularly, Radio Access Network (RAN) 201b may include base station 203 (such as an eNodeB), gateway 206, and core network 211 providing voice and/or data communications between wireless device 101b and public switched telephone network 215 and/or the Internet 217 as shown in FIG. 1. Moreover, base station 203, gateway 206, and core network 211 may provide transport level communications between an M2M application residing on wireless device 101*b* (also referred to as an M2M service device) and the Internet 217, to thereby support communications between wireless device 101*b* and M2M application server 401*b*. Accordingly, M2M application server 401*b* may be provided separately from RAN 201*b*, with RAN 201*b* and M2M application server 401*b* being operated by different service providers. More particularly, gateway 206 may include mobility anchor 205 (such as a base station controller) and Internet Protocol (IP) anchor 207 (such as a Packet Data Network gateway or PDN gateway).

Moreover, wireless device 101*b* may be provided according to the structure of FIG. 12 including transceiver 151, processor 153, memory 155, and user interface 157. Transceiver 151 and base station 203 may thus be configured to provide a wireless communications link between processor 153 and gateway 206. Memory 155 may be configured to store identification elements shown in FIG. 4 (including transport address, transport/service hardware ID, transport subscription ID, M2M service subscription ID, and M2M application ID) and to store code for the service application residing at wireless device 101*b*. In addition, M2M application server 401*b* may be provided according to the structure of FIG. 13 including transceiver 451, processor 453, and memory 455, with memory 455 storing code for the application service residing at M2M application server 401*b*. Accordingly, processors 153 and 453 may provide the application service for wireless device 101*b*.

Figure 6:
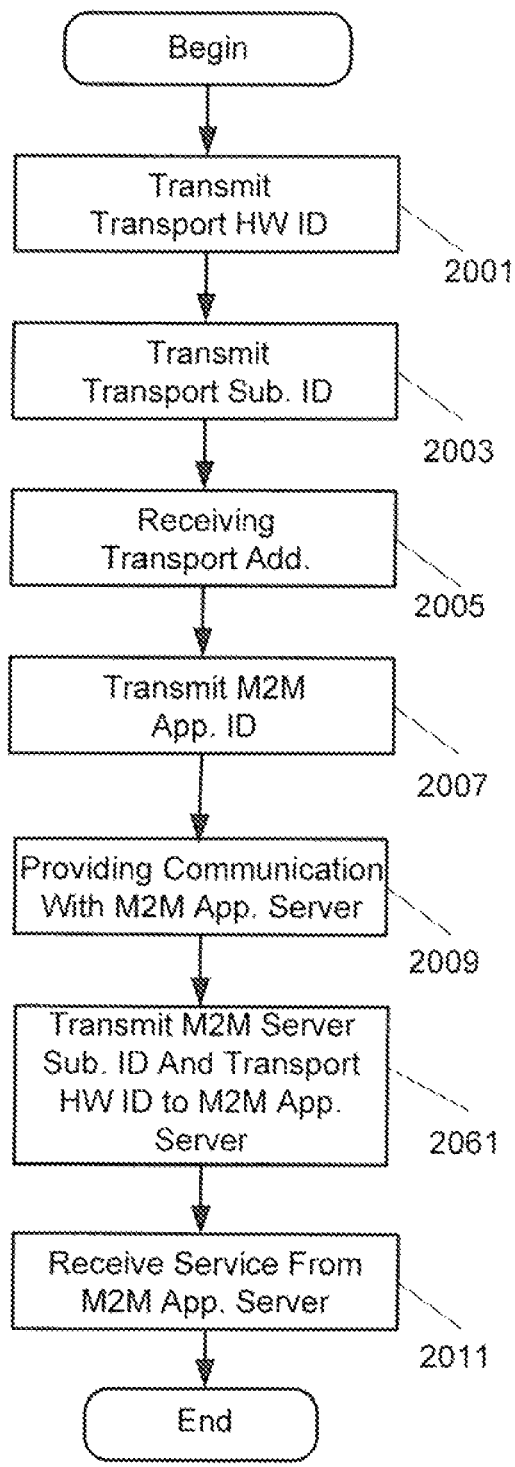

Operations of wireless device 101*b* are shown in FIG. 6. As shown in FIG. 6, processor 153 may be configured to transmit the transport hardware ID (from memory 155) through transceiver 151 and base station 203 to gateway 206 at block 2001, and gateway 206 may be configured to authorize or block communications from wireless device 101*b* based on the transport hardware ID. As noted above, transport hardware ID may uniquely identify wireless device 101*b*. If wireless device 101*b* is authorized to proceed responsive to the transport hardware ID, processor 153 may be configured to transmit the transport subscription ID (from memory 155) through transceiver 151 and base station 203 to gateway 206 at block 2003, and gateway 206 may be configured to verify or block communications from wireless device 101*b* based on the transport subscription ID. If wireless device 101*b* is verified responsive to the transport subscription ID, gateway 206 may transmit a transport address (e.g., an IP address) through base station 203, and the transport address may be received (through transceiver 151) at processor 153 at block 2005 and saved in memory 155. Once the transport address is received at wireless device 101*b*, a transport layer may be available between wireless device 101*b* and M2M application server 401*b* through base station 203, gateway 206, and core network 211, and the transport address may define a network address for wireless device 101*b*.

Once the transport layer is available, service layer communications may be transmitted over the transport layer between wireless device 101*b* and M2M application server 401*b*, and service layer communications provided over the transport layer may be transparent with respect to base station 203, gateway 206, and core network 211. At block 2007, processor 153 may transmit M2M application ID over the transport layer to establish communications with M2M application server 401*b*. The M2M application ID identifies the M2M application provided by M2M application server 401*b*, and the M2M application ID also identifies a communication path between wireless device 101*b* and M2M application server 401*b*. In addition to the identification of the M2M application, M2M application ID may also include elements identifying wireless device 101*b*, such as elements of some or all of service hardware ID and/or service subscription ID.

Because service and transport device functionalities are integrated in the same wireless device 101*b*, separate transport and service hardware IDs are not required. Because RAN 201*b* and M2M application server 401*b* are provided separately and/or RAN 201*b* and M2M application server 401*b* are operated by different service providers, however, separate verifications/authorizations may be required at RAN 201*b* and M2M application server 401*b*. Accordingly, transport subscription ID is provided for service with RAN 201*b*, and M2M service subscription ID is provided for service with M2M application server. Processor 153 may thus provide communication with M2M application server 401*b* over an M2M data transport layer through RAN 401*b* at block 2009 using the transport address as the network address for wireless device 101*a*, and then at block 2061, processor 153 may transmit M2M service subscription ID and transport hardware ID to M2M application server. M2M application server can thus authorize/block service for wireless device 101*b* based on the M2M service subscription ID, transport hardware ID, and/or M2M application ID. At block 2011, processor 153 may receive service from M2M application server 401*b* over the M2M data transport layer, with M2M application server authorization based on the transport hardware ID, the M2M service subscription ID, and/or the M2M application ID.

Figure 5:
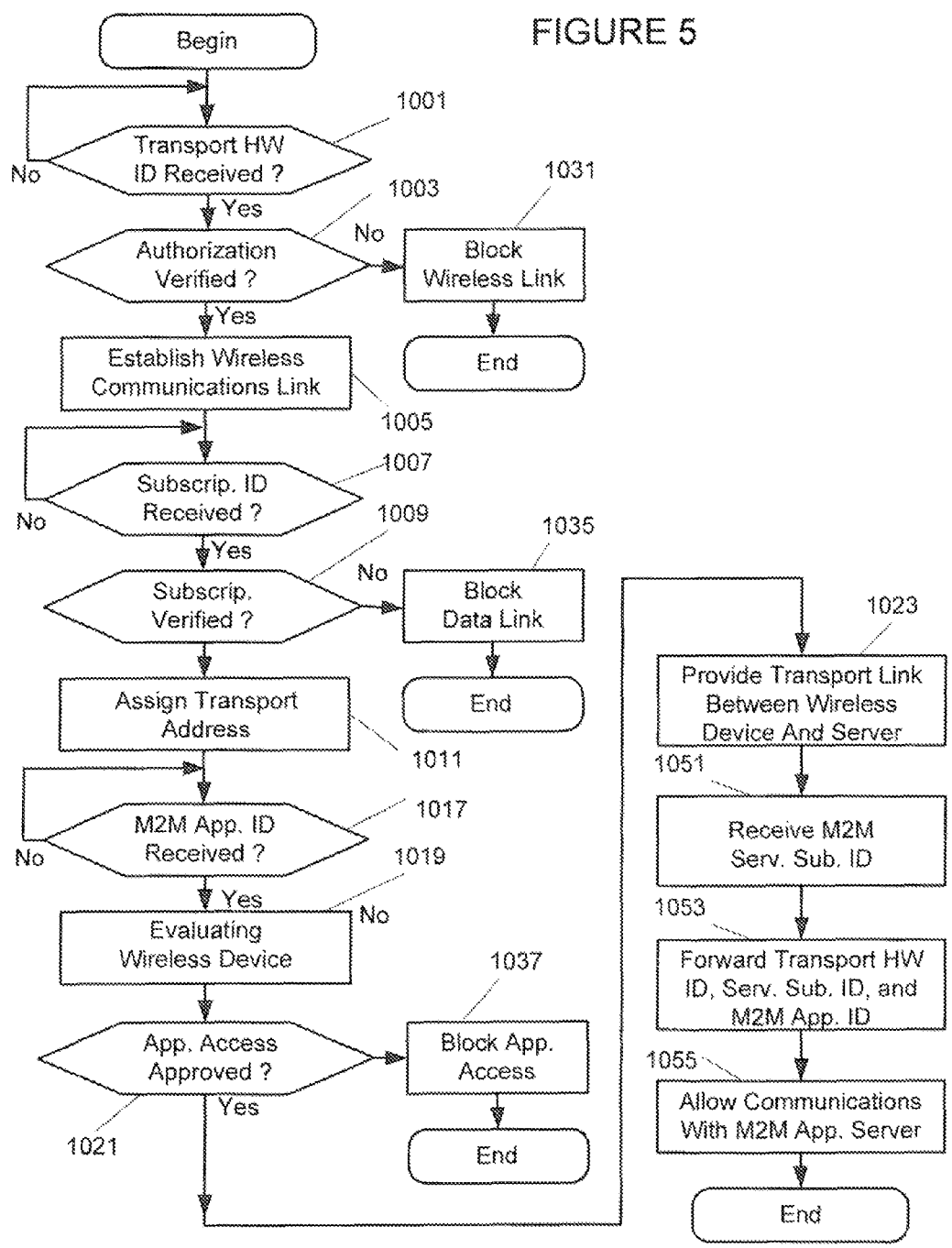
FIGS. 5 and 6 are flow charts illustrating operations of network and wireless terminal elements of FIG. 4 according to some embodiments.

Operations of RAN 201*b* are shown in FIG. 5. As shown in FIG. 5, responsive to receiving the transport hardware identification from wireless device 101*b* through base station 203 at gateway 206 at block 1001, mobility anchor 205 may be configured to verify whether the transport hardware ID of wireless device 101*b* is authorized. Responsive to determining that the transport hardware ID is not authorized, mobility anchor 205 may be configured to block communication between wireless device 101*b* and RAN 201*b*. Responsive to determining that the transport hardware ID is authorized, mobility anchor 205 may be configured to establish a wireless communications link between wireless device 101*b* and RAN 201*b* at block 1005.

Responsive to receiving the transport subscription ID from wireless device 101*b* at gateway 206 at block 1007, IP anchor 207 may be configured to verify whether the transport subscription ID of wireless device 101*b* is authorized. Responsive to determining that the transport subscription ID is not authorized, IP anchor 207 may be configured to block a data link at block 1035. Responsive to determining that the transport subscription ID is authorized, IP anchor 207 is configured to assign a transport address as a network address for wireless device 101*b* at block 1011, and to transmit the transport address to wireless device 101*b*. Responsive to receiving the M2M application ID from wireless device 101*b* at block 1017, IP anchor 207 may evaluate wireless terminal 101*b* based on its transport subscription ID at block 1019. Responsive to determining that wireless device 101*b* is not authorized to communicate with M2M application server 401*b* at block 1021 (based on evaluation of its subscription ID), IP anchor 207 may be configured to block access to M2M application server 401*b* at block 1037. Responsive to determining that wireless device 101*b* is authorized to communicate with M2M application server 401*b* at block 1021, IP anchor 207 (and more generally gateway 206) may be configured to provide an M2M data transport layer at block 1023 through the Internet 217 between wireless device 101*b* and M2M application server 401b using the transport address as a network address for wireless device 101b.

At block 1051, gateway 206 may be configured to receive the M2M service subscription ID from wireless device 101b. At block 1053, gateway 206 may be configured to forward the M2M service subscription ID, the transport hardware ID, and the M2M application ID to the M2M application server. At block 1055, gateway 206 is configured to allow communication over the Internet 217 between wireless device 101b and M2M application server 401b to support M2M application server 401b providing application service for wireless device 101b.

FIG. 17 is a flow chart showing operations of M2M application server 401b. Because M2M application server 401a is provided outside of RAN 201b and/or because different service providers operate both M2M application server 401b and RAN 201b, separate authorizations at M2M application server 401b may be required. In other words, authorization at gateway 206 may be required based on transport hardware and transport subscription IDs, and separate authorization at M2M application server 401b may be required based on transport hardware ID, M2M service subscription ID, and/or M2M application ID. Accordingly, M2M application server 401b may be configured to receive transport hardware ID at block 1401, to receive M2M service subscription ID at block 1403, and to receive M2M application ID at block 1505. Moreover, each of these IDs may be received at processor 453 through transceiver 451 over the Internet 217. At block 1407, processor 453 may be configured to authorize wireless device 101b based on the transport hardware ID, the M2M service subscription ID, and/or the M2M application ID.

Responsive to authorizing wireless device 101b, processor 453 may be configured to provide service for wireless device 101b through transceiver 451, the Internet 217, and RAN 201b. As noted above, the M2M application ID may identify an M2M application provided by M2M application server 401b as well as a communications path between wireless device 101b and M2M server 401b. Accordingly, M2M server 401b may be configured to use the M2M application identification to identify the communications path between M2M application server and wireless device 101b. While not shown as a separate step, processor 453 may also save the M2M application ID, transport hardware ID, and M2M service subscription ID in memory 455.

In addition or in an alternative, M2M application server 401b may be configured to initiate service with wireless device 101b using the M2M application ID for wireless device 101b, which may have been previously stored in memory 455 as discussed below with respect FIG. 16. In particular, memory 455 may provide at block 1505 a plurality of different M2M application IDs associated with a respective plurality of difference wireless devices. Accordingly, processor 453 may select the M2M application ID for wireless device 101b to initiate service for wireless device 101b at block 1509. A first service for wireless device 101b, such as a registration service, may be used to transmit the M2M application ID for wireless device 101b from wireless device 101b to M2M application server 401b, for example, as discussed above with respect to FIGS. 5 and 6. M2M server 401b, for example, may periodically (e.g., at timed intervals) initiate service to automatically retrieve information from wireless device 101b, and/or M2M server 401b may initiate service to download updates to wireless device as needed when updates are available. While not explicitly shown in FIG. 16, M2M application server 401b may use transport hardware ID and/or M2M service subscription ID of wireless device 101b, in addition to M2M application ID for wireless device 101b, to initiate service for wireless device 101b. Like the M2M application ID for wireless device 101b, transport hardware and M2M service subscription IDs may be obtained at M2M application server 401b during a registration and stored in memory 455.

Figure 7:
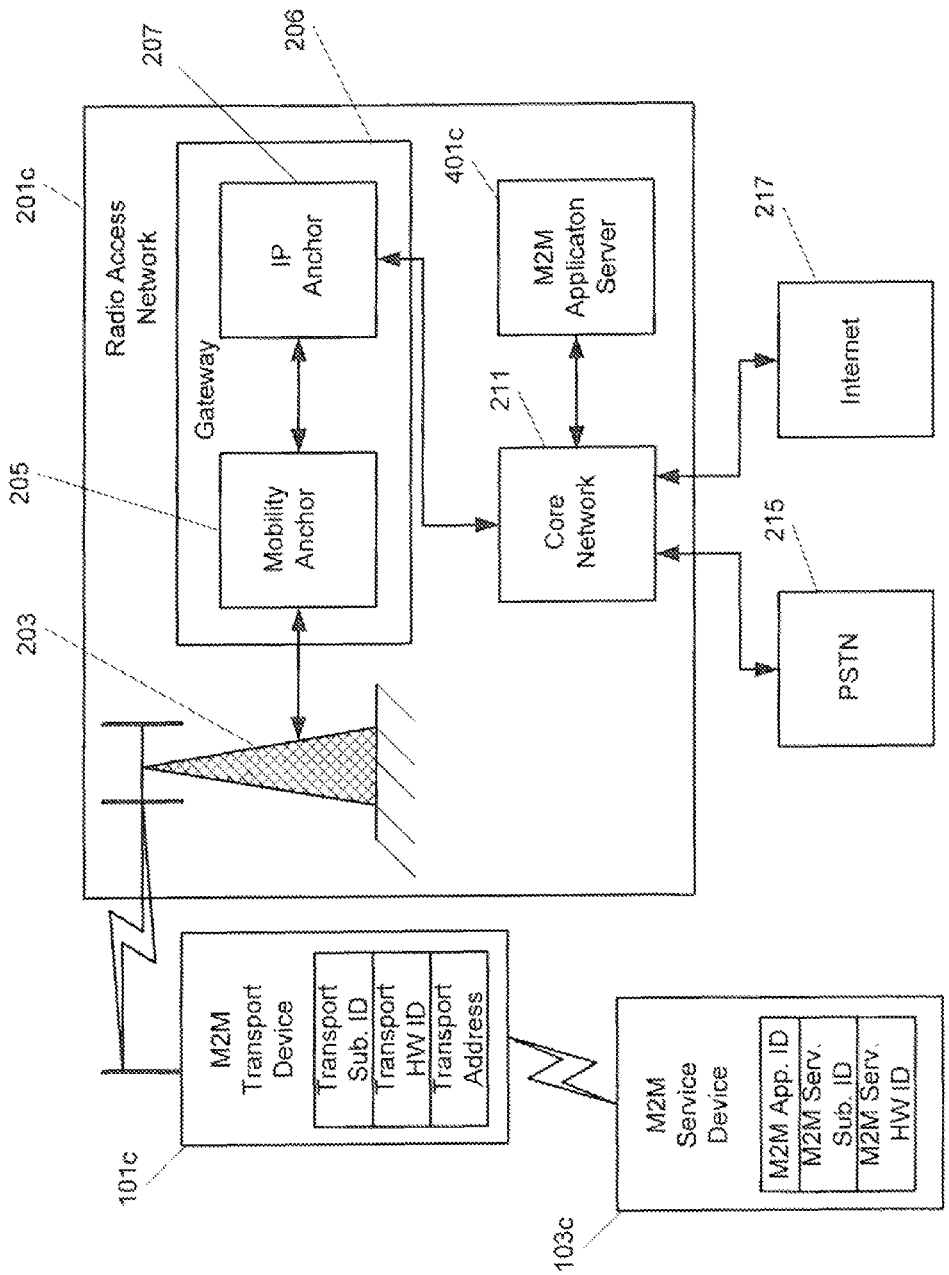
FIG. 7 is a block diagram of a communication system that is configured to support machine-to-machine applications according to some embodiments.
Figure 8:
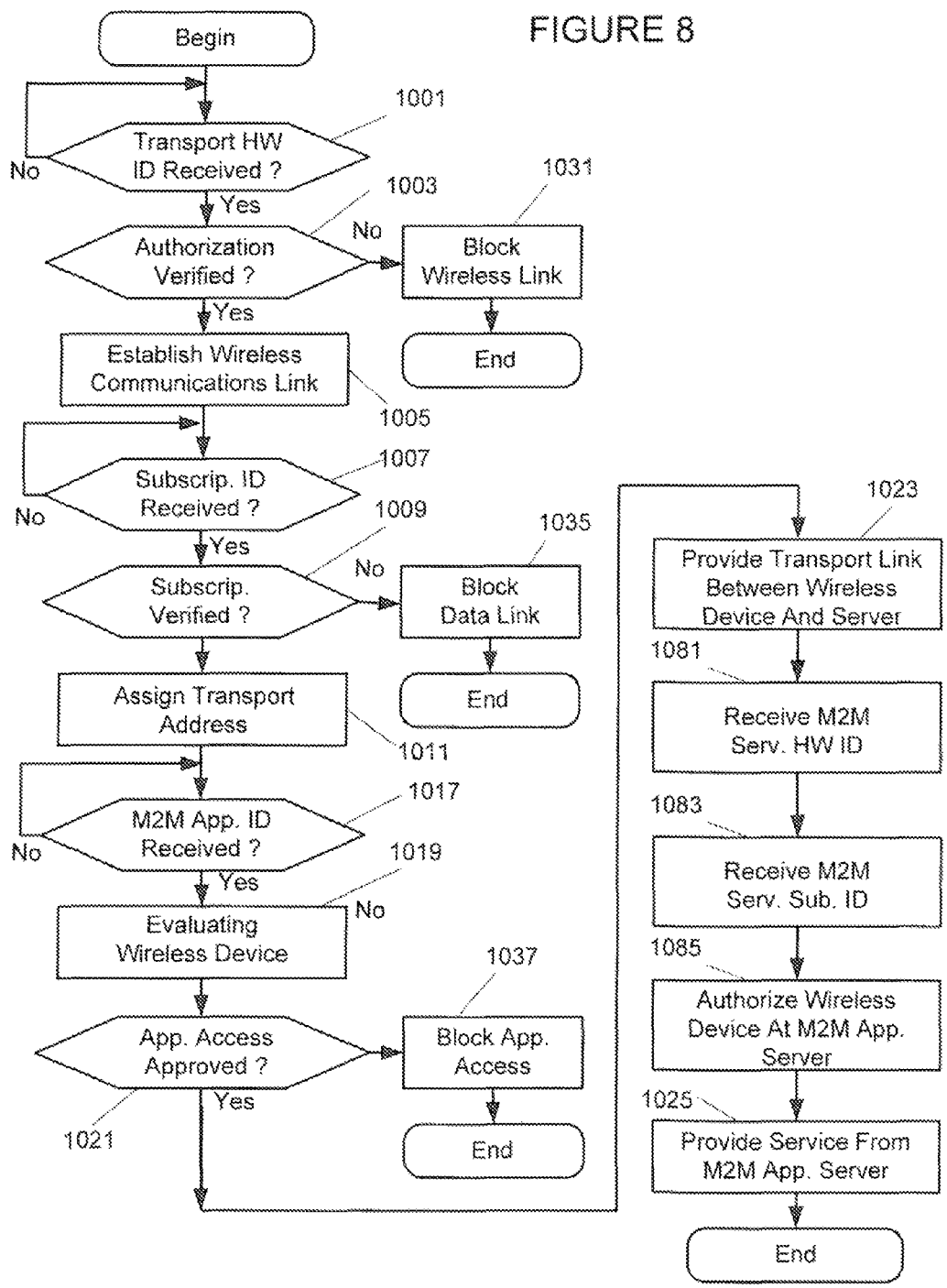
FIGS. 8 and 9 are flow charts illustrating operations of network and wireless terminal elements of FIG. 7 according to some embodiments.
Figure 9:
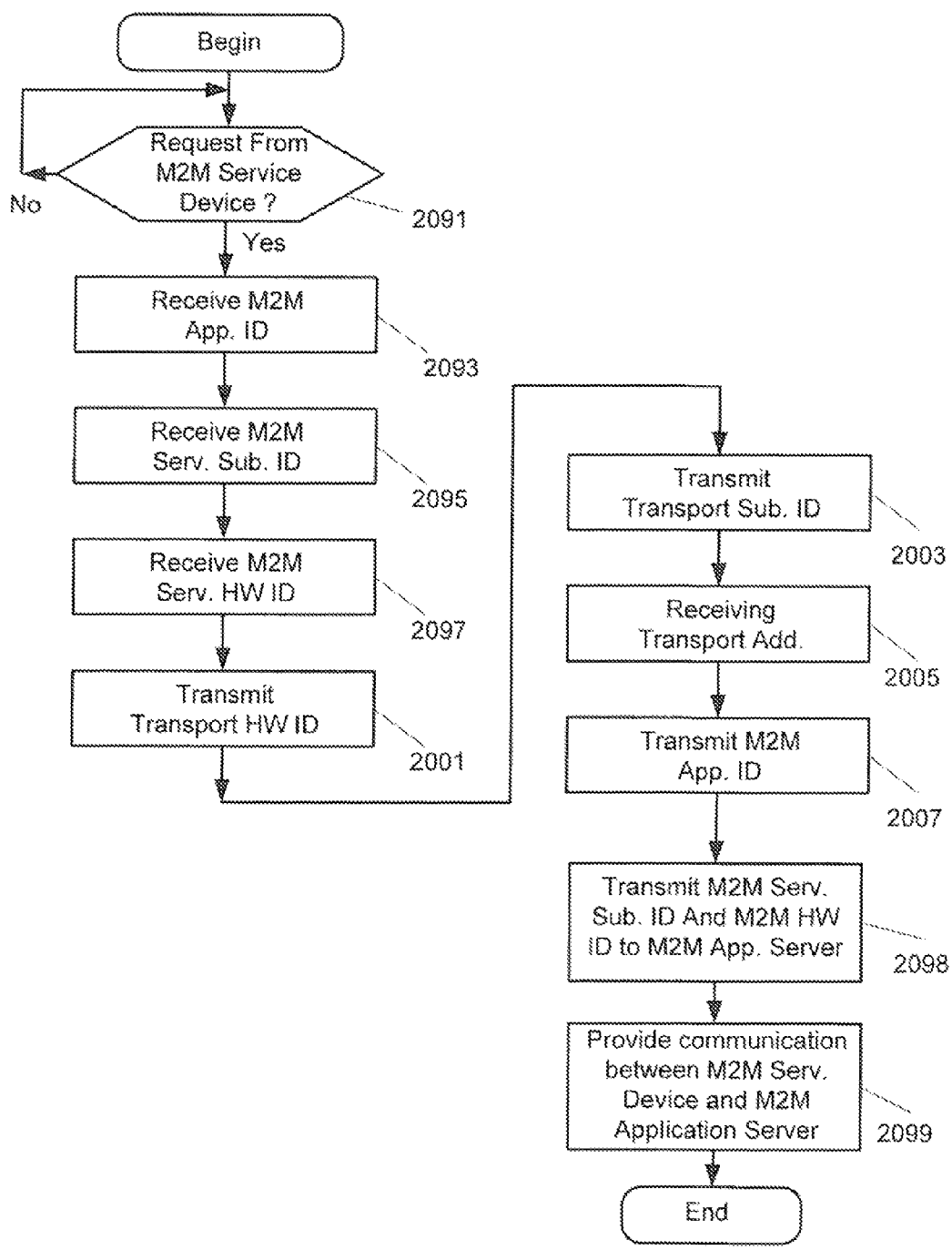

According to some embodiments illustrated in FIGS. 7-9, an M2M service device 103c may communicate with RAN 201c indirectly through transport device 101c, and the same provider may operate RAN 201c and M2M application server 401c. Because service and transport functions are provided by different devices (i.e., by transport device 101c and M2M service device 103c), a transport subscription ID, a transport hardware ID, and a transport address may be provided for transport device 101c, and an M2M application ID, an M2M service subscription ID, and an M2M service hardware ID may be provided for M2M service device 103c. Even though the same provider operates both RAN 201c and M2M application server 401c, the different transport and service devices 101d and 103d may require different transport and M2M service subscription IDs to allow separate authentication of the transport and service devices 101d and 103d.

More particularly, Radio Access Network (RAN) 201c may include base station 203 (such as an eNodeB), gateway 206, and core network 211 providing voice and/or data communications between wireless device 101c and public switched telephone network 215 and/or the Internet 217 as shown in FIG. 7. In addition, base station 203, gateway 206, and core network 211 of RAN 201c and wireless transport device 101c may provide transport level communications between an M2M application residing on wireless M2M service device 103c and M2M application server 401c. Moreover, M2M application server 401c may be included as an element of RAN 201c, with RAN 201c and M2M application server 401c being operated by a same service provider. More particularly, gateway 206 may include mobility anchor 205 (such as a base station controller) and Internet Protocol (IP) anchor 207 (such as a Packet Data Network gateway or PDN gateway).

Moreover, wireless transport device 101c and wireless M2M service device 130c may each be provided according to the structure of FIG. 12. More particularly, each of wireless transport device 101c and wireless M2M service device 103c may respectively include transceiver 151, processor 153, memory 155, and user interface 157. Wireless transport device 101c and base station 203 may thus be configured to provide a wireless communications link between processor 153 and transceiver 151 of wireless M2M service device and gateway 206. Memory of wireless transport device 101c may be configured to store transport identification elements shown in FIG. 7 (including transport address, transport hardware ID, and transport subscription ID). Memory of wireless service device 103c may be configured to store M2M service identification elements shown in FIG. 7 (including M2M service hardware ID, M2M service subscription ID, and M2M application ID) and to store code for the service application residing at wireless M2M service device 101c. In addition, M2M application server 401c may be provided according to the structure of FIG. 13 including transceiver 451, processor 453, and memory 455, with memory 455 storing code for the application service residing at M2M application server 401c. Accordingly, processor 153 of wireless M2M service device 103c and processor 453 M2M application server may provide the application service for wireless M2M service device 101c.

Operations of wireless transport device 101c are shown in FIG. 9. M2M service device 103c, for example, may be wirelessly coupled (e.g., via BlueTooth, WiFi, WiMax, etc.) with M2M transport device 101*c*, and M2M service device 103*c* may be configured to transmit a request for service to M2M transport device. The request may include the M2M application ID, the M2M service subscription ID, and the M2M service hardware ID, or the identifications may be sent separately. According to still other embodiments, one or more identifications of M2M service device 103*c* may be stored in memory at transport device 101*c* so that only the request need be transmitted.

As shown in FIG. 9, upon receipt of the request at block 2091 from wireless M2M service device 103*c*, wireless transport device 101*c* may receive M2M application ID at block 2093, wireless transport device 101*c* may receive M2M service subscription ID at block 2095, and wireless transport device 101*c* may receive M2M service hardware ID at block 2097. The order of transmission and receipt of the M2M service ID elements may vary, all of the M2M service ID elements may be received with the request, and/or one or more of the service ID elements may be saved in memory at the transport device during a previous registration process.

At block 2001, the processor and transceiver of transport device 101*c* may be configured to transmit the transport hardware ID (identifying transport device 101*c*) to gateway 206 responsive to the request. Gateway 206 may be configured to authorize or block communications from wireless transport device 101*c* based on the transport hardware ID. As noted above, transport hardware ID may uniquely identify wireless transport device 101*c*. If wireless transport device 101*c* is authorized to proceed responsive to the transport hardware ID, the processor of wireless transport device 101*c* may be configured to transmit the transport subscription ID through base station 203 to gateway 206 at block 2003, and gateway 206 may be configured to verify or block communications from wireless transport device 101*c* based on the transport subscription ID. If wireless transport device 101*c* is verified responsive to the transport subscription ID, gateway 206 may transmit a transport address (e.g., an IP address) through base station 203, and the transport address may be received by wireless transport device 101*c* at block 2005 and saved in memory at transport device 101*c*. Once the transport address is received at wireless transport device 101*c*, a transport layer may be available between wireless M2M service device 101*c* and M2M application server 401*c* through wireless transport device 101*c*, base station 203, gateway 206, and core network 211, and the transport address may define a network address for wireless transport device 101*c*.

Once the transport layer is available, service layer communications may be transmitted over the transport layer between wireless M2M service device 103*c* and M2M application server 401*c*, and service layer communications provided over the transport layer may be transparent with respect to wireless transport device 101*c*, base station 203, gateway 206, and core network 211. At block 2007, wireless M2M service device 103*c* and/or wireless transport device 101*c* may transmit M2M application ID over the transport layer to establish communications with M2M application server 401*c*. For example, the M2M application ID may be included with the original request (before establishing the transport layer), and wireless transport device 101*c* may transmit the M2M application ID after establishing the transport layer. In an alternative, the wireless transport device 101*c* may signal the wireless M2M service device 103*c* that the transport layer has been established, and the wireless M2M service device 103*c* may then transmit the M2M application ID through wireless transport device 101*c*, base station 203, gateway 206, and core network 211 to M2M application server 401*c*. The M2M application ID identifies the M2M application provided by M2M application server 401*c*, and the M2M application ID also identifies a communication path between wireless M2M service device 103*c* and M2M application server 401*c*. In addition to the identification of the M2M application, M2M application ID may also include elements identifying wireless device 103*c*, such as elements of some or all of service hardware ID and/or service subscription ID.

At block 2098, wireless transport device 101*c* may transmit the M2M service subscription ID and the M2M service hardware ID to M2M application server 401*c*. As with the M2M application ID, the M2M service subscription ID and/or the M2M service hardware ID may be received at wireless transport device 101*c* before or after establishing the transport layer. M2M application server 401*c* may then authorize/block service for wireless M2M service device 103*c*. Once the M2M application server 401*c* authorized service device 103*c*, transport device 101*c* may be configured to provide communication between M2M service device 103*c* and M2M application server 401*c* at block 2099.

Because service and transport device functionalities are provided in separate devices separate authorization/verification operations may be required for transport device 101*c* at RAN 201*c* and for M2M service device 103*c* at M2M application server 401*c*. Stated in other words, the initial authorization/verification based on the transport hardware and/or transport subscription IDs may provide access to/through RAN 201*c*, and a second authorization/verification based on M2M service subscription, hardware, and application IDs may provide access to M2M application server 401*c*.

Operations of RAN 201*c* are shown in FIG. 8. As shown in FIG. 8, responsive to receiving the transport hardware identification from wireless transport device 101*c* through base station 203 at gateway 206 at block 1001, mobility anchor 205 may be configured to verify whether the transport hardware ID of wireless transport device 101*c* is authorized. Responsive to determining that the transport hardware ID is not authorized, mobility anchor 205 may be configured to block communication between wireless device 101*c* and RAN 201*c*. Responsive to determining that the transport hardware ID is authorized, mobility anchor 205 may be configured to establish a wireless communications link between wireless transport device 101*c* and RAN 201*c* at block 1005.

Responsive to receiving the transport subscription ID from wireless transport device 101*c* at gateway 206 at block 1007, IP anchor 207 may be configured to verify whether the transport subscription ID of wireless device 101*c* is authorized. Responsive to determining that the transport subscription ID is not authorized, IP anchor 207 may be configured to block a data link at block 1035. Responsive to determining that the transport subscription ID is authorized, IP anchor 207 is configured to assign a transport address as a network address for wireless transport device 101*c* at block 1011, and to transmit the transport address to wireless transport device 101*c*. Responsive to receiving the M2M application ID from wireless transport device 101*c* at block 1017, IP anchor 207 may evaluate wireless transport device 101*c* based on its transport subscription ID at block 1019. Responsive to determining that wireless transport device 101*c* is not authorized to communicate with M2M application server 401*c* at block 1021 (based on evaluation of its transport subscription ID), IP anchor 207 may be configured to block access to M2M application server 401*c* at block 1037. Responsive to determining that wireless transport device 101*c* is authorized to communicate with M2M application server 401*c* at block 1021, IP anchor 207 (and more generally gateway 206) may be configured to provide an M2M data transport layer at block 1023 between wireless transport device 101*c* and M2M application server 401c using the transport address as a network address for wireless transport device 101c.

At blocks 1081 and 1083, gateway 206 may be configured to receive service hardware and service subscription IDs corresponding to M2M service device 103c. Moreover, M2M application server 401c (which may be considered as an element of RAN 201c) may be configured to block/authorize service for M2M service device 103c based on the M2M service subscription ID, the M2M service hardware ID, and/or the M3M application ID at block 1085, and M2M application server 401c may be configured to provide service at block 1025. As noted above, M2M service device 103c and transport device 101c may require separate authorizations by gateway 206 and/or M2M application server 401c. Because M2M application server 401c may be included within RAN, the authorization based on ID elements of service device 103c may be performed within RAN 201c outside of M2M application server 401c.

Figure 10:
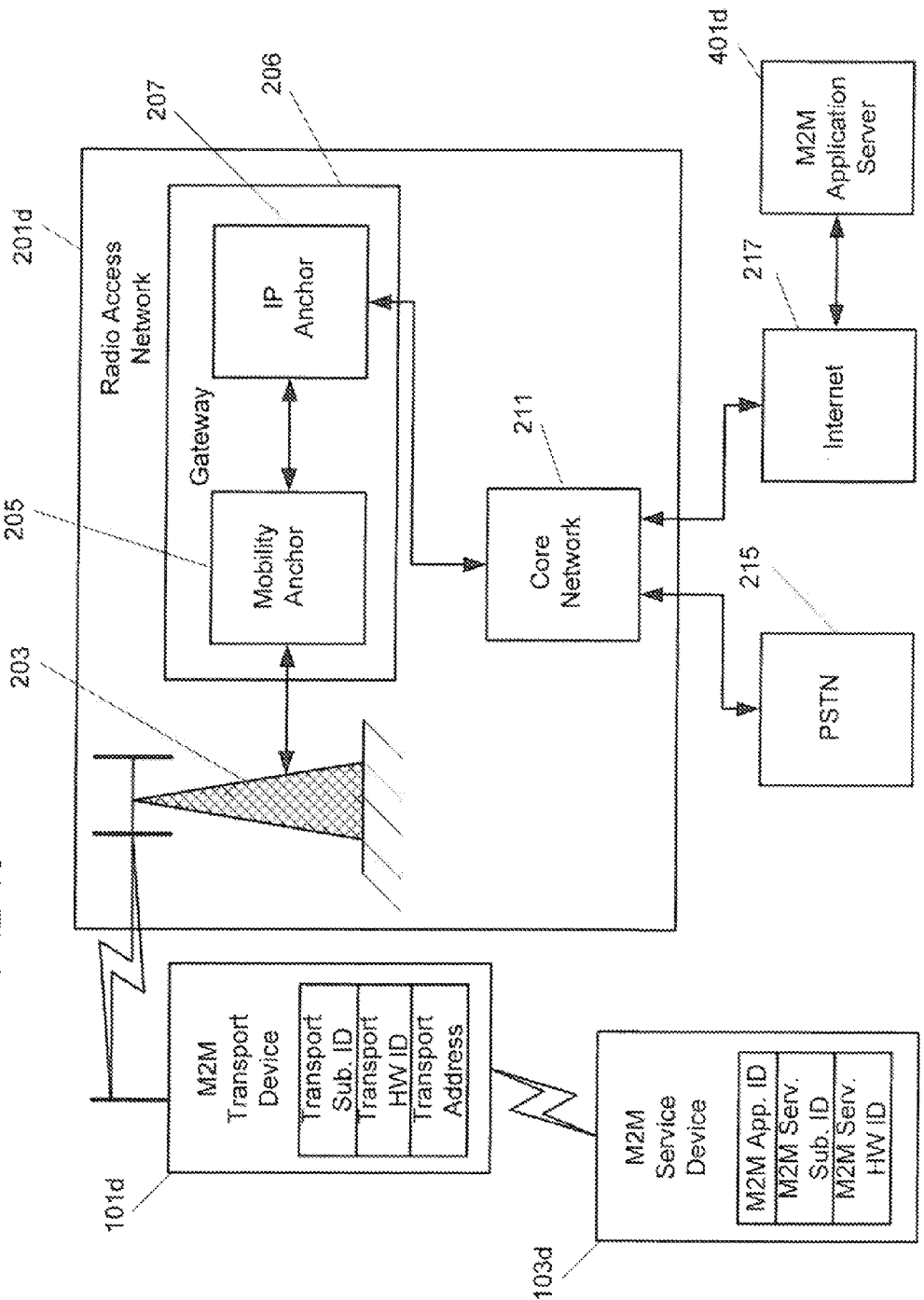
FIG. 10 is a block diagram of a communication system that is configured to support machine-to-machine applications according to some embodiments.
Figure 11:
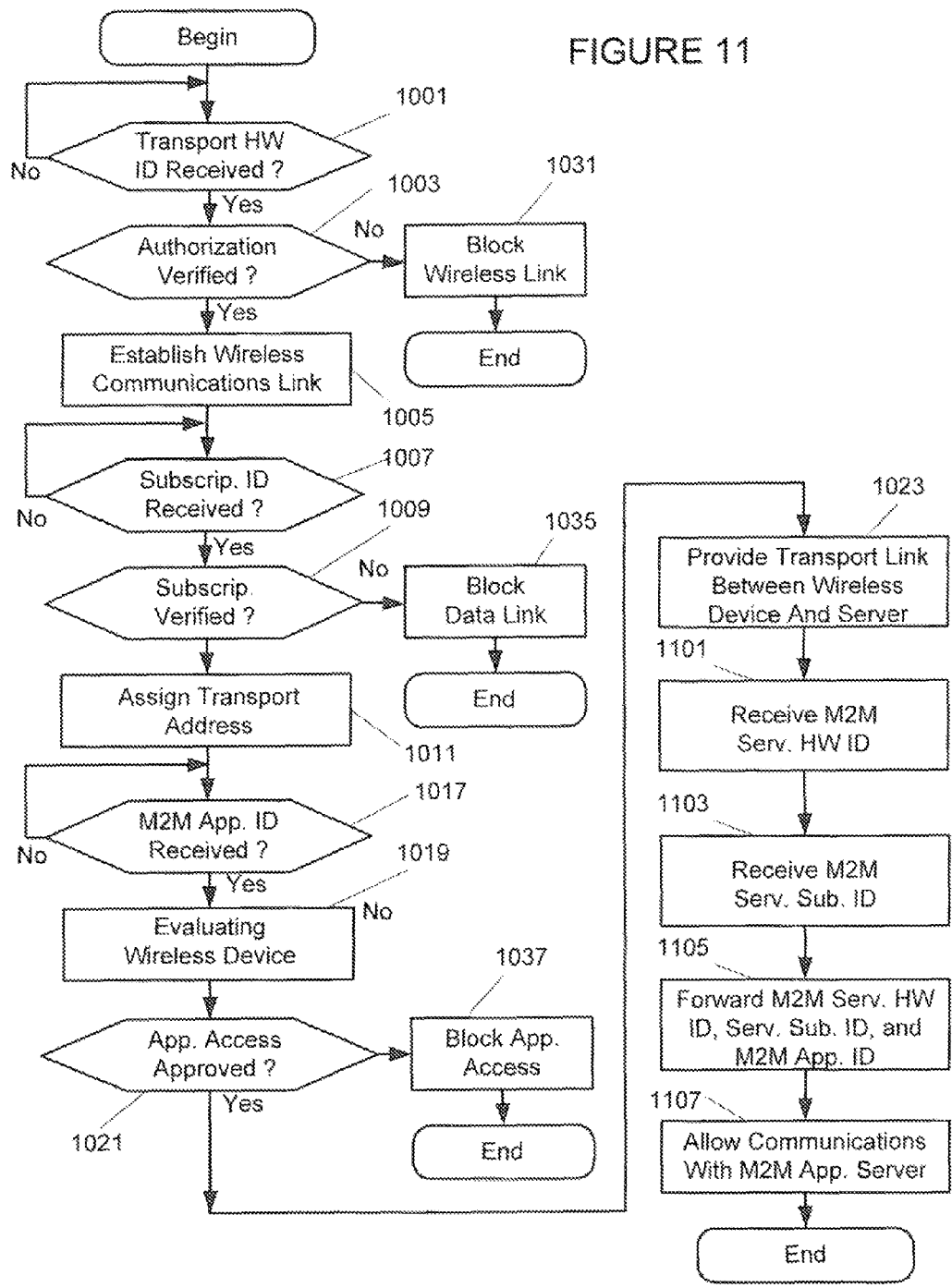
FIG. 11 is a flow chart illustrating operations of network terminal elements of FIG. 10 according to some embodiments.

According to some embodiments illustrated in FIGS. 10-11, an M2M service device 103d may communicate with RAN 201d indirectly through transport device 101d, and different providers may operate RAN 201d and M2M application server 401d. Because service and transport functions are provided by different devices (i.e., by transport device 101d and M2M service device 103d), a transport subscription ID, a transport hardware ID, and a transport address may be provided for transport device 101d, and an M2M application ID, an M2M service subscription ID, and an M2M service hardware ID may be provided for M2M service device 103d. Operations of transport and service devices 101d and 103d will not be further discussed with respect to FIG. 10, because operations of these devices may the same as discussed above with respect to transport and service devices 101c and 103c of FIG. 7.

More particularly, Radio Access Network (RAN) 201d may include base station 203 (such as an eNodeB), gateway 206, and core network 211 providing voice and/or data communications between wireless device 101d and public switched telephone network 215 and/or the Internet 217 as shown in FIG. 10. In addition, base station 203, gateway 206, and core network 211 of RAN 201d and wireless transport device 101d may provide transport level communications between an M2M application residing on wireless M2M service device 103d and M2M application server 401d. Moreover, M2M application server 401d may be provided outside of RAN 201d, with RAN 201d and M2M application server 401c being operated by different service providers. More particularly, gateway 206 may include mobility anchor 205 (such as a base station controller) and Internet Protocol (IP) anchor 207 (such as a Packet Data Network gateway or PDN gateway). In addition, M2M application server 401d may be provided according to the stricture of FIG. 13 including transceiver 451, processor 453, and memory 455, with memory 455 storing code for the application service residing at M2M application server 401d. Accordingly, processor 153 of wireless M2M service device 103d and processor 453 M2M application server 401d may provide the application service for wireless M2M service device 101d.

Operations of RAN 201d are shown in FIG. 11. As operations 1001 through 1023 of FIG. 11 may be substantially the same as the same numbered operations of FIGS. 5 and/or 8, these operations will not be discussed further herein. Once the transport layer is established through wireless transport device 101d and RAN 201d, gateway 206 may be configured to receive service hardware and service subscription IDs corresponding to M2M service device 103c at blocks 1101 and 1103. At block 1105, gateway 206 may be configured to forward M2M service hardware ID, service subscription ID, and M2M application ID to M2M application server 401d, and M2M application server may use these IDs to authorize/block service for M2M service device 103d. At block 1107, gateway 206 may allow communications between M2M service device 103d and M2M application server 401d. Operations of M2M application server 401d may be substantially the same as those discussed above with respect to M3M application server 401b of FIG. 4 and will thus not be discussed further herein.

Identification systems according to some embodiments may allow communications between a specific M2M application residing on an M2M service device to communicate at any time with a respective M2M application server regardless of the type of M2M transport (e.g., direct or indirect) being used by the M2M service device. Accordingly, the M2M application (residing on the M2M service device) may initiate communications with the M2M application server, and/or the M2M server may initiate communications with the M2M application (residing on the M2M service device). Communications between the M2M application (residing on the M2M service device) and the M2M application server may be provided independently of and transparently with respect to the M2M transport service provider operating the RAN over which communications are provided. Identification systems according some embodiments may thus support mobility of the M2M service device by allowing direct (e.g., through a RAN) and/or indirect (e.g., through a separate transport device and a RAN) communications between M2M service device and M2M server, and/or may also support an M2M service device that always communicates through a separate transport device. Some embodiments discussed herein may thus provide flexible options for identification (hardware and subscription) in hierarchical and/or nested networks.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method of operating a machine-to-machine, M2M, application server providing an M2M application, the method comprising:
    receiving, at the M2M application server, an M2M application identification from an M2M service device, wherein the M2M application identification identifies an M2M application provided by the M2M application server and wherein the M2M application identification identifies a communication path between the M2M service device and the M2M application server;
    receiving, at the M2M application server, an M2M service subscription identification from the M2M service device;
    authorizing the M2M service device at the M2M application server at least partially based on the M2M service subscription identification; and
    in response to the M2M service device being authorized, providing service according to the M2M application from the M2M application server to the M2M service device using the M2M application identification to identify the communications path between the M2M application server and the M2M service device,
    wherein the M2M application identification is a globally unique identification, and
    wherein the M2M application identification and M2M service subscription identification are received indirectly through:
        a wireless access network, and
        a wireless device authorized by the wireless access network to provide communication between the M2M application server and the M2M service device.

2. The method of claim 1 further comprising:
    receiving, at the M2M application server, an M2M service hardware identification from the M2M service device;

wherein providing the M2M application identification comprises receiving the M2M application identification from the M2M service device at the M2M application server; and wherein providing service comprises providing the service according to the M2M application responsive to receiving the M2M application identification.

3. The method of claim 1 wherein providing the M2M application identification comprises providing a plurality of different M2M application identifications associated with a respective plurality of different M2M service devices in memory of the M2M application server, and wherein providing service comprises initiating the service according to the M2M application using the M2M application identification to identify the communications path between the M2M application server and the M2M service device.

4. The method of claim 1 wherein the M2M application server comprises an element of a wireless access network, further comprising:
   receiving an M2M service hardware identification from the M2M service device; and
   before providing service, authorizing the M2M service device at the M2M application server at least partially based on the M2M service hardware identification.

5. The method of claim 4 wherein the M2M service subscription identification comprises a Mobile Identification Number, Mobile Subscriber Integrated Services Digital Network Number, a Mobile Directory Number, a Network Access Identifier, and/or an International Mobile Subscription Identity, and wherein the M2M service hardware identification comprises a Medium Access Control address, a serial number, an International Mobile Equipment Identification, and/or a Mobile Equipment Identification.

6. The method of claim 1 wherein the M2M application identification is provided according to a format of a uniform resource identifier.

7. The method of claim 1 wherein the M2M application identification includes an application identification that identifies the M2M application provided by the M2M application server and an M2M hardware identification for the M2M service device.

8. A method of operating a wireless device, the method comprising:
   transmitting a transport hardware identification from the wireless device to a wireless access network to initiate a wireless communications link wherein the transport hardware identification uniquely identifies the wireless device;
   responsive to the wireless access network providing a wireless communications link, transmitting a transport subscription identification from the wireless device to the wireless access network;
   receiving a transport address from the wireless access network wherein the transport address defines a network address for the wireless device;
   receiving a request from a machine-to-machine, M2M, service device, wherein the request includes an M2M application identification that identifies an M2M application provided by an M2M application server and wherein the M2M application identification identifies a communication path between the wireless device and the M2M application server;
   transmitting the M2M application identification to the wireless access network;
   providing communication with the M2M application server over an M2M data transport layer through the wireless access network using the transport address as the network address for the wireless device;
   receiving an M2M service subscription identification from the M2M service device;
   transmitting the M2M service subscription identification over the M2M data transport layer to the M2M application server for authorization;
   after the M2M service device is authorized by the M2M application server at least partially based on the M2M service subscription identification, providing communication between the M2M service device and the M2M application server,
   wherein the M2M application identification is a globally unique identification.

9. The method of claim 8 wherein the transport hardware identification comprises at least one of a Medium Access Control address, a serial number, an International Mobile Equipment Identification, and/or a Mobile Equipment Identification.

10. The method of claim 8 wherein the transport subscription identification comprises at least one of a Mobile Identification Number, Mobile Subscriber Integrated Services Digital Network Number, a Mobile Directory Number, a Network Access Identifier, and/or an International Mobile Subscriber Identity.

11. The method of claim 8 further comprising:
    receiving service from the M2M application server over the M2M data transport layer with M2M application server authorization based on the transport hardware identification and/or the transport subscription identification.

12. The method of claim 8 further comprising:
    transmitting the transport hardware identification and an M2M application service subscription identification over the M2M data transport layer through the wireless network; and
    receiving service from the M2M application server over the M2M data transport layer with M2M application server authorization based on the transport hardware identification and/or the M2M application service subscription identification.

13. The method of claim 8 further comprising:
    receiving an M2M service hardware identification from the M2M service device, wherein the M2M service hardware identification uniquely identifies the M2M service device;
    transmitting the M2M service hardware identification over the M2M data transport layer to the M2M application server.

14. The method of claim 13 wherein the M2M service subscription identification comprises a Mobile Identification Number, Mobile Subscriber Integrated Services Digital Network Number, a Mobile Directory Number, a Network Access Identifier, and/or an International Mobile Subscription Identity, and wherein the M2M service hardware identification comprises a Medium Access Control address, a serial number, an International Mobile Equipment Identification, and/or a Mobile Equipment Identification.

15. The method of claim 8 wherein the M2M application identification is provided according to a format of a uniform resource identifier.

16. The method of claim 8 wherein the M2M application identification includes an application identification that identifies the M2M application provided by the M2M application server and an M2M hardware identification for the wireless device.

17. A wireless device comprising:
a transceiver configured to provide a wireless communications link with a wireless access network;
memory configured to store a transport hardware identification that uniquely identifies the wireless device, a transport subscription identification for the wireless device, and a machine-to-machine, M2M, application identification that identifies an M2M application provided by an M2M application server wherein the M2M application identification identifies a communication path between the wireless device and the M2M application server; and
a processor coupled to the transceiver and the memory, wherein the processor is configured to:
transmit the transport hardware identification through the transceiver to the wireless access network to initiate a wireless communications link,
transmit the transport subscription identification through the transceiver to the wireless access network responsive to the wireless access network providing a wireless communications link,
receive a transport address from the wireless access network through the transceiver wherein the transport address defines a network address for the wireless device,
receive a request from an M2M service device, wherein the request includes the M2M application identification,
transmit the M2M application identification through the transceiver to the wireless access network,
provide communication with the M2M application server over an M2M data transport layer through the transceiver and the wireless access network using the transport address as the network address for the wireless device,
receive an M2M service subscription identification from the M2M service device,
transmit the M2M service subscription identification over the M2M data transport layer and through the transceiver to the M2M application server for authorization, and
after the M2M service device is authorized by the M2M application server at least partially based on the M2M service subscription identification, provide communication between the M2M service device and the M2M application server,
wherein the M2M application identification is a globally unique identification.

18. The wireless device of claim 17 wherein the transport hardware identification comprises at least one of a Medium Access Control address, a serial number, an International Mobile Equipment Identification, and/or a Mobile Equipment Identification, and wherein the transport subscription identification comprises at least one of a Mobile Identification Number, Mobile Subscriber Integrated Services Digital Network Number, a Mobile Directory Number, a Network Access Identifier, and/or an International Mobile Subscriber Identity.

19. The wireless device of claim 17 wherein the processor is further configured to:
receive an M2M service hardware identification from the M2M service device through the transceiver wherein the M2M service hardware identification uniquely identifies the M2M service device, and
transmit the M2M service hardware identification through the transceiver over the M2M data transport layer to the M2M application server.

20. A machine-to-machine, M2M, application server comprising:
memory configured to store an M2M application identification and an M2M service subscription identification provided from an M2M service device, wherein the M2M application identification identifies an M2M application provided by the M2M application server and wherein the M2M application identification identifies a communication path between the wireless device and the M2M application server; and
a processor coupled to the memory, wherein the processor is configured to provide service according to the M2M application from the M2M application server to the M2M service device using the M2M application identification to identify the communications path between the M2M application server and the M2M service device, and using the M2M service subscription identification to authorize the M2M service device before providing the service,
wherein the M2M application identification is a globally unique identification, and
wherein the M2M application identification and M2M service subscription identification are received indirectly through:
a wireless access network, and
a wireless device authorized by the wireless access network to provide communication between the M2M application server and the M2M service device.

* * * * *